United States Patent [19]
Herb

[11] Patent Number: 4,893,973
[45] Date of Patent: Jan. 16, 1990

[54] EXPANSION DOWEL WITH AXIALLY EXTENDING PROJECTIONS

[75] Inventor: Armin Herb, Apfeldorf, Fed. Rep. of Germany

[73] Assignee: Hilti Aktiengesellschaft, Fürstentum Liechtenstein, Liechtenstein

[21] Appl. No.: 245,131

[22] Filed: Sep. 15, 1988

[30] Foreign Application Priority Data

Sep. 15, 1987 [DE] Fed. Rep. of Germany ....... 3730860

[51] Int. Cl.$^4$ .............................................. F16B 13/06
[52] U.S. Cl. ........................................ 411/55; 411/61; 411/71
[58] Field of Search .................. 411/30, 31, 42, 55, 411/60, 61, 57, 71-73, 74

[56] References Cited

U.S. PATENT DOCUMENTS 1,000,715  8/1911  Caywood ............................... 411/60
1,499,071  6/1924  Pleister .................................. 411/60

FOREIGN PATENT DOCUMENTS 319871  4/1957  Switzerland ........................... 411/61
353880  6/1961  Switzerland ........................... 411/60
569774  6/1945  United Kingdom .

*Primary Examiner*—Neill R. Wilson
*Attorney, Agent, or Firm*—Toren, McGeady & Associates

[57] ABSTRACT

An expansion dowel includes an axially extending sleeve with a leading end and a trailing end. The sleeve is conically shaped for at least an axially extending portion from the leading end with the conically shaped portion diverging outwardly toward the trailing end. Axially extending projections protrude outwardly from the outer surface of the conically shaped portion of the sleeve and have at least one axially extending flank with a planar surface inclined relative to the axis of the sleeve. The at least one inclined flank forms a working surface which acts against any pulling out force on the sleeve and ensures high anchoring values.

9 Claims, 1 Drawing Sheet

EXPANSION DOWEL WITH AXIALLY EXTENDING PROJECTIONS

BACKGROUND OF THE INVENTION

The present invention is directed to an expansion dowel including an axially extending expansion sleeve partially slit in the axial direction. The sleeve is formed of sheet metal and has an internal thread extending from the trailing end of the sleeve toward the leading end. The sleeve forms an axially extending bore or opening which is conically shaped from the leading end toward the trailing end for at least a portion of the sleeve. The conically shaped portion has axially extending projections protruding radially outwardly from the outside surface of the conically shaped portion. The projections are stamped outwardly from the sleeve.

Plastic dowels are often used as secondary fasteners. Such plastic dowels have the disadvantage that the fastening fails in the event of fire. As a result, simple dowels formed of sheet metal have replaced plastic dowels to a great extent.

Sheet metal dowels, such as disclosed in GB-PS 569 774, are formed of a rolled expansion sleeve with a screw thread for a fastening screw. To expand the sleeve in such known dowels, the sleeve forms an axially extending bore or opening which converges conically toward the leading end and has projections stamped outwardly in the sleeve.

From the viewpoint of production, these known dowels have the advantage of great economy, however, from the viewpoint of application they have the disadvantage that the anchoring values drop sharply if the borehole formed in the receiving material for the dowel is too large or if the receiving material is excessively soft.

SUMMARY OF THE INVENTION

Therefore, the primary object of the present invention is to provide an expansion dowel which is simple and economical to produce and ensures sufficiently high anchoring values in all types of applications.

In accordance with the present invention, the projections formed in the expansion sleeve have at least one surface or flank, extending in the axial direction and having a planar surface inclined relative to the axis of the sleeve. The inclined surface is considered to have a component facing toward the trailing end of the expansion sleeve. During the expansion process, the outwardly stamped projections are at least partially pressed into the surface of the borehole in the receiving material. The axially extending surface or flank of the projections has its planar surface extending at an angle to the axis of the sleeve. The planar surface may have a leading end and a trailing end at the outside surface of the conically shaped portion. The leading end may lead the trailing end in the rotational direction in which a fastening member is screwed into the thread in the interior of the expansion sleeve.

During the expansion process, the outwardly stamped projections are at least partially pressed into the surface of the borehole in the receiving material. The inclined flank with its leading end leading the trailing end in the screwing in direction, provides a form-locking engagement with the receiving material so that the axially extending inclined flanks afford surfaces acting against any pulling out force on the expansion sleeve. As a result, anchoring values for the expansion dowel are maintained even when the surface in the borehole is uneven or the borehole is formed in a soft receiving material.

In one preferred embodiment of the invention, the outwardly stamped projections have a radially outer surface with an increasing width toward the leading end, that is in the direction in which the expansion sleeve is inserted into a borehole. With the width of the projections increasing toward the leading end, the supporting surface of the expansion dowel at the borehole surface is enlarged toward the leading end and achieves a more uniform distribution of the expansion pressure. The inclined flank with the leading end leading in the direction in which a fastening member is screwed into the thread in the expansion sleeve, is formed by at least one of the axially extending flanks of the projection, extending transversely of the radially outer surface.

In another preferred embodiment the axially extending projections are inclined relative to the axis of the expansion sleeve. In this embodiment both of the axially extending flanks of the projections are inclined in the same direction. Accordingly, the leading end leads the trailing end of each of the flanks in the direction in which a fastening element is screwed into the internal thread of the sleeve As a result, as with the previously described embodiment, the expansion sleeve is prevented from moving axially out of the borehole as the fastening element is screwed in.

In still another embodiment the circle circumscribing the radially outer surface of the projections increases toward the leading end of the expansion sleeve. In this embodiment, it is the outer surface of the projection which provides the desired engagement with the surface of the borehole for securing the expansion dowel against forces tending to pull it out of the borehole. Further, this arrangement affords a large contact area between the expansion sleeve and the borehole surface. The diameter of the circumscribing circle of the outer surface of the projections can increase continuously or in a step-wise manner toward the leading end of the sleeve. As a result, the axially extending flanks of the projections can be inclined relative to the axis of the sleeve or can be disposed in a plane perpendicular to the axis.

It is preferred that the internal thread is pressed or rolled into a sheet metal blank forming the sleeve prior to the step of rolling the blank to form the sleeve. This type of thread formation enables only a limited accuracy of the internal thread. Therefore, it is advantageous that webs located between the projections from the sleeve have a radius reduced in the direction in which a fastening member is inserted into the thread. With such a construction of the webs between the projections, it is possible for a fastening member to be threaded easily into the expansion sleeve, since the threaded flanks completely engage one another only after a predetermined turning angle. Such an arrangement of the webs provides a favorable distribution of the expansion pressure around the circumference of the sleeve.

Another desirable feature of the invention is the provision of a circumferentially extending tubular section at the leading end of the sleeve. Such a tubular section reinforces the sleeve at its leading end, where it is loaded most intensively during expansion, and, accordingly, prevents damage to the expansion sleeve. Preferably, the tubular section is formed by bending an axially extending portion of the leading end of the sleeve over upon itself so that the tubular section is located radially outwardly from the adjacent leading portion of the sleeve The formation of the tubular section can be effected prior to the rolling step for producing the expansion sleeve.

It is advantageous that the tubular section is bent outwardly Such an outwardly bent tubular section contacts the borehole surface during the expansion operation and provides a uniform distribution of the expansion pressure. The free end of the tubular section faces toward the trailing end of the expansion sleeve and affords additional form-locking engagement with the borehole surface, leading to higher forces for pulling the dowel out of the borehole. By bending the tubular section outwardly relative to the sleeve, a rounded portion is formed at the leading end of the dowel and facilitates its insertion into a borehole.

The maximum outside diameter of the tubular section preferably corresponds to the largest outside diameter of the expansion sleeve. As a result, it is ensured that the tubular section contacts the borehole surface at the beginning of the expansion process. With the tubular section supported at the borehole surface, it helps to prevent the expansion sleeve from being rotated during the expanding operation effected by screwing a fastening element into the threaded sleeve.

Furthermore, it is advantageous that the trailing free end of the tubular section extends along the front half of the expansion sleeve and ensures, above all, that the fastening element is securely threaded into the sleeve. The tubular section can include cut-out portions in the region of the projections to prevent any excessive overlapping of material in such region.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 2:
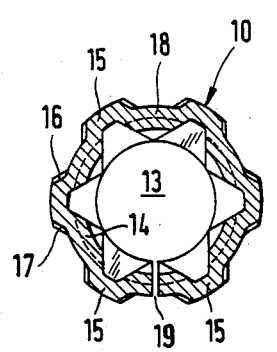
FIG. 2 is a cross-sectional view of the expansion dowel displayed in FIG. 1 taken along the line II—II.
Figure 1:
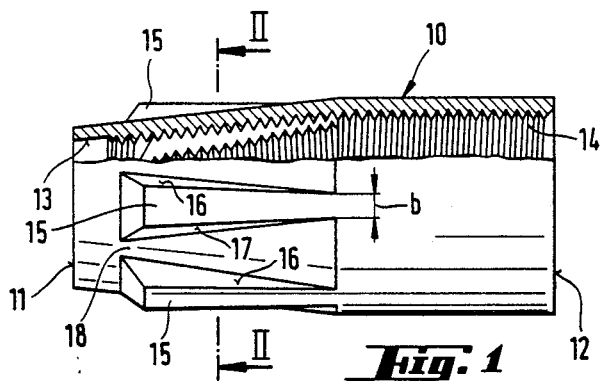
FIG. 1 is an axially extending view, partly in section, of an expansion dowel embodying the present invention.
Figure 3:
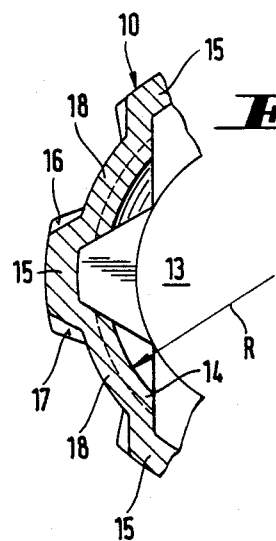
FIG. 3 is a partial sectional view of the expansion dowel set forth in FIG. 2 and shown on an enlarged scale.

In FIGS. 1 to 3 an expansion dowel is displayed formed by an axially extending expansion sleeve 10 with a leading end 11 and a trailing end 12, that is, the leading end 11 is inserted first into a borehole into which the dowel is to be expanded. Expansion sleeve 10 has an axially extending bore 13 and the sleeve and the bore are conically reduced toward the leading end 11 from a point intermediate the trailing end 12 and the leading end 11. Further, an internal thread 14 is formed in the inner surface of the bore 13 with the thread extending from the trailing end through the trailing cylindrically shaped portion of the sleeve into the leading conically shaped portion. Axially and radially outwardly extending projections 15 are formed in the expansion sleeve in the conically shaped portion of the sleeve. The projections 15 have a radially outer surface with a width b increasing from the trailing end of the projection to its leading end. The increasing width of the radially outer surface results in axially extending flanks 16, 17 each inclined at an angle with regard to the axis of the sleeve. The flanks have a component facing toward the trailing end 12 of the sleeve. Between the flanks of adjacent projections, webs 18 are formed by the sleeve in the conically shaped portion having the radius R decreasing in the direction in which a fastening member is threaded into the internal thread 14 for expanding the sleeve. The decreasing radius of the webs 18 facilitates the screwing of a fastening member into the internal thread 14. As the fastening member moves toward the leading end 11 of the sleeve 10 the sleeve expands outwardly pressing the projections 15 toward the surface of the borehole in the receiving material into which the expansion dowel is inserted Expansion sleeve 10 has an axially extending slot 19, note FIG. 2, for facilitating its radial expansion.

Figure 4:
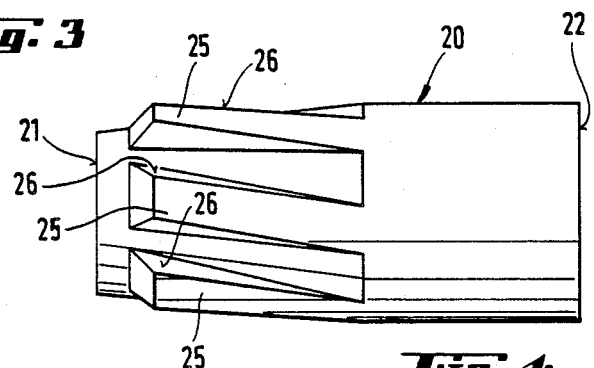
FIG. 4 is an axially extending side view of another embodiment of an expansion dowel incorporating the present invention.

In FIG. 4 another expansion dowel embodying the present invention is shown and is formed by an axially extending expansion sleeve 20 with a leading end 21 and a trailing end 22 spaced apart in the direction in which the sleeve is inserted into a borehole in a receiving material. Expansion sleeve 20 is conically shaped at the leading axially extending portion and axially and radially outwardly extending projections 25 are formed in the conically shaped portion. The projections 25 are formed so that the opposite axially extending flanks 26 are inclined at an angle to the axis of the expansion sleeve. As viewed in FIG. 4 each flank 26 has a leading end at the outer surface of the sleeve which leads the trailing end at the outer surface of the sleeve in the direction of rotation in which a fastening element is threaded into the sleeve One flank 26 is considered as having a component facing toward the trailing end 22 of the sleeve. Due to this arrangement the planar surface of one flank 26 in the same manner as the planar surface of the flank 16 engages the surface of the borehole so that the planar surface in contact with the surface of the borehole provides a force retaining the sleeve within the borehole acting against any force pulling the sleeve out of the borehole.

Figure 6:
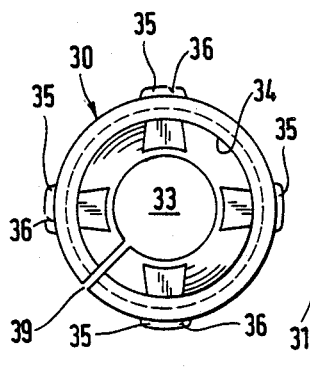
FIG. 6 is a trailing end view of the expansion dowel depicted in FIG. 5 with a view taken in the direction of arrow VI.
Figure 5:
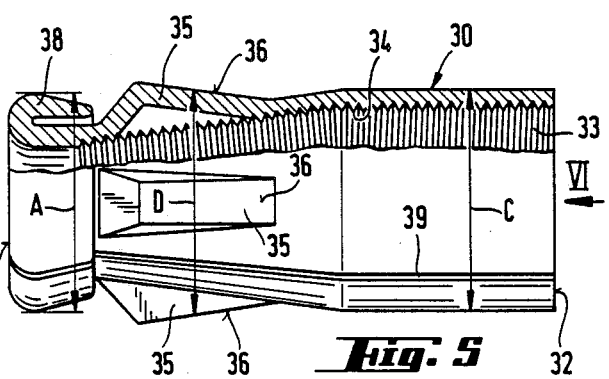
FIG. 5 is an axially extending view partly in section, of still another embodiment of an expansion dowel incorporating the present invention.

In FIGS. 5 and 6 another embodiment of the invention is shown by an expansion sleeve 30 with a leading end 31 and a trailing end 32 spaced apart in the direction in which the sleeve is inserted into a borehole. The expansion sleeve 30 has an axially extending bore 33 extending from the trailing end to the leading end. The axially extending leading end portion of the sleeve is conically shaped with its surfaces converging in the direction toward the leading end 31. An internal thread 34 is formed on the inside of the sleeve extending through the trailing cylindrically shaped portion from the trailing end into the conically shaped portion. Axially and radially/outwardly pressed projections 35 extend outwardly from the outside surface of the conically shaped portion of the sleeve. The projections 35 have an axially extending radially outer surface 36 extending from the trailing end of the projection toward its leading end. The radially outer surface 36 is a planar surface which has an increasing diameter of a circumscribing circle toward the leading end of the sleeve. The radially outer surface or flank 36 is considered as having a component of its outwardly sloping surface facing toward the trailing end 32. To reinforce the expansion sleeve 30 it is provided with an axially extending tubular portion 38 bent outwardly and then rearwardly over the leading end of the sleeve. The tubular portion 38 extends rearwardly from the leading end 31 toward the trailing end and, as shown, terminates approximately at the leading ends of the projections 35. The maximum outside diameter A of the tubular portion 38 corresponds substantially to the maximum outside diameter C of the expansion sleeve 30, that is, the diameter in the cylindrically shaped trailing portion of the sleeve. The tubular section 38 affords an effective support of the leading end of the expansion sleeve 30 at the surface of the borehole in the receiving material and also a uniform distribution of the expanding pressure is achieved. Expansion sleeve 30 has at least one axially extending slot 39. In addition to the flank 36 formed by the radially outer surface of the projections 35, each projection has a pair of laterally arranged axially extending flanks similar to the flanks 16 and 17 in FIG. 1. The sleeves 10, 20 and 30 can be formed by rolling a sheet metal blank into the desired sleeve shape. The projections can be pressed or stamped in the blank before the sleeve is formed. Further, the threads can also be formed in the flank before it is rolled.

While specific embodiments of the invention have been shown and described in detail to illustrate the application of the inventive principles, it will be understood that the invention may be embodied otherwise without departing from such principles.

I claim:

1. Expansion dowel comprising an axially extending sleeve having a leading end to be inserted first into a borehole and a trailing end, said sleeve being at least partially axially slit from the leading end thereof, said sleeve having an outside surface and an inside surface with the inside surface forming an axially extending bore with the bore being threaded from the trailing end at least toward the leading end, at least an axially extending portion of said sleeve being conically shaped and diverging from the leading end toward the trailing end, the conically shaped axially extending portion including axially extending conically-shaped outside surface sections diverging from the leading end toward the trailing end, said sleeve having axially extending projections extending outwardly from the axially extending outside surface sections thereof and located at least in the conically-shaped portion thereof, said projections spaced circumferentially apart by said outside surface sections, said projections having at least one axially extending surface located outwardly from the outside surface and forming an outside planar surface inclined relative to the axis of said sleeve, said outside inclined planar surface having a leading end and a trailing end with the leading end thereof spaced from a line parallel to the central axis and passing through the trailing end thereof.

2. Expansion dowel, as set forth in claim 1, wherein said projections have a width extending perpendicularly to the axis of said sleeve with said width increasing from the trailing end of said projection to the leading end.

3. Expansion dowel, as set forth in claim 1, wherein said projections have axially extending flanks extending from the trailing end to the leading end of said projections with said flanks extending outwardly from the outside surface section of the conically shaped portion of said sleeve and with said flanks having an axially extending planar surface inclined relative to the axis of said sleeve.

4. Expansion dowel, as set forth in claim 3, wherein at least one of said flanks has a leading end and a trailing end each located at the outside surface of said conically shaped portion, the thread of said sleeve having a rotation direction about the axis of the sleeve for threading a fastening member from the trailing end toward the leading end of said sleeve, and the leading end of said at least one of said flanks leading the trailing end of said at least one of said flanks in the rotational direction of the thread.

5. Expansion dowel, as set forth in claim 1, wherein a circumscribing circle about a radially outer surface of said projections increases in diameter from the trailing end to the leading end of said projections.

6. Expansion dowel comprising an axially extending sleeve having a leading end to be inserted first into a borehole and a trailing end, said sleeve being at least partially axially slit from the leading end thereof, said sleeve having an outside surface and an inside surface with the inside surface forming an axially extending bore with the bore being threaded from the trailing end at least toward the leading end, at least an axially extending portion of said sleeve being conically shaped and diverging from the leading end toward the trailing end, said sleeve having axially extending projections outwardly from the outside surface thereof and located at least in the conically-shaped portion thereof, said projections having at least one axially extending surface located outwardly from the outside surface and forming an outside planar surface inclined relative to the axis of said sleeve, said outside inclined planar surface having a leading end and a trailing end with the leading end thereof spaced from a line parallel to the central axis and passing through the trailing end thereof, the leading end of said expansion sleeve has an axially extending tubular section extending toward the trailing end and located radially outwardly from the leading end of the bore through said sleeve.

7. Expansion dowel, as set forth in claim 6, wherein said tubular section is bent outwardly from the leading end of said sleeve and then rearwardly.

8. Expansion dowel, as set forth in claim 7, wherein the maximum outside diameter of said tubular section corresponds substantially to the maximum outside diameter of said expansion sleeve.

9. Expansion dowel, as set forth in claim 6, wherein the trailing end of said tubular section is located adjacent the leading end of said projections.

* * * * *

UNITED STATES PATENT AND TRADEMARK OFFICE
CERTIFICATE OF CORRECTION

PATENT NO. : 4,893,973

DATED : January 16, 1990

INVENTOR(S) : Armin Herb

It is certified that error appears in the above-identified patent and that said Letters Patent is hereby corrected as shown below: Title page:

[73] Assignee: Hilti Aktiengesellschaft, Fürstentum, Liechtenstein

Signed and Sealed this

Fifth Day of March, 1991

Attest:

HARRY F. MANBECK, JR.

Attesting Officer

Commissioner of Patents and Trademarks